(12) United States Patent
Kredo et al.

(10) Patent No.: US 6,449,636 B1
(45) Date of Patent: Sep. 10, 2002

(54) SYSTEM AND METHOD FOR CREATING A DYNAMIC DATA FILE FROM COLLECTED AND FILTERED WEB PAGES

(75) Inventors: Thomas J. Kredo; Andrew J. Mitchell, both of Rochester, NY (US)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/392,367

(22) Filed: Sep. 8, 1999

(51) Int. Cl.[7] .............................................. G06F 13/00
(52) U.S. Cl. ........................................ 709/206; 707/10
(58) Field of Search .............................. 709/206; 707/10

(56) References Cited

U.S. PATENT DOCUMENTS

| | | | |
|---|---|---|---|
| 5,740,549 A | 4/1998 | Reilly | 705/14 |
| 5,805,442 A | 9/1998 | Crater et al. | 700/9 |
| 5,813,007 A | 9/1998 | Nielsen | 707/10 |
| 5,832,506 A | 11/1998 | Kuzma | 707/200 |
| 5,870,559 A | 2/1999 | Leshem et al. | 709/224 |
| 5,889,951 A | 3/1999 | Lombardi | 709/219 |
| 6,393,462 B1 * | 5/2002 | Mullen-Schultz | 709/206 |

* cited by examiner

Primary Examiner—Kenneth R. Coulter
(74) Attorney, Agent, or Firm—Hunton & Williams

(57) ABSTRACT

The invention marks a reference point at a chosen Internet site such a page on the World Wide Web. It stores the address of the page and a reference location on the page that is proximate to desired data. The program generates and stores a label corresponding to the desired data. When the program is later activated, it automatically searches the Web for the stored pages, accesses the site with the stored site address and marked reference point and retrieves the targeted data at the site corresponding to the stored label.

17 Claims, 7 Drawing Sheets

SYSTEM AND METHOD FOR CREATING A DYNAMIC DATA FILE FROM COLLECTED AND FILTERED WEB PAGES

BACKGROUND OF THE INVENTION

Currently, Internet-based data can be widely scattered, resulting in large collections of Universal Record Locators (URLs) in browser bookmark lists. To assemble data stored at different URLs, the user of a Web browser must either: 1) display each URL's Web data in a separate window, requested individually; 2) display each URL's Web data in sequence in the same window; or 3) rely on the designers of specific Web pages to include at a single URL all the data the user wishes to assemble. Each of these methods is cumbersome, and forces the user to assemble the scattered data with manual operations. At present there is no method for automatically extracting information from numerous web pages and incorporating the extracted information in a personal web page.

Definitions

The term 'script', as used here, refers to a sequence of statements in a programming language or procedural language, statements which, when carried out, accomplish some task or function in some system. A script may be created by a human being or a computer program; in the current context such a script is executed (i.e., its statements are carried out in their programmed order) within one or more interconnected computer systems.

The term 'filter script', as used here, refers to a script designed to select components of its inputs to be processed and produced as its outputs.

The term 'search engine', as used here, refers to any Website which provides for its users one or more text indices enabling the users to locate occurrences of specific text appearing in documents accessible on the World Wide Web.

The term 'Web spider', as used here, refers to the automated software employed by the Web search engine sites to examine each Website on the World Wide Web and generate search-engine text indices for all significant terms made available for access by those Websites.

Discussion of Prior Art

U.S. Pat. No. 5,832,506 (Kuzma)

The Kuzma patent describes the establishment and updating of a directory, stored on one server computer system, using input from users on other client systems. The flow of the information in the Kuzma invention is from the clients to the server, for inclusion in the server's directory. It does not control raw data insertion to the user's browsed pages, based on the user's own definitions of filter scripts to obtain the data.

U.S. Pat. No. 5,805,442 (Crater et al.)

The Crater patent does not cover a system where the user can dynamically define a process for gathering any data from any URL.

U.S. Pat. No. 5,889,951 (Lombardi)

The Lombardi patent does not grant the user any ability to define desired information.

SUMMARY

The invention provides a method and apparatus for rapid and accurate assembly and use of dynamic data from widely-scattered Web pages, on a single template Web page of the user's design. It solves the problem of the prior art and provides a method and apparatus for automatically extracting information from numerous web pages and incorporating the extracted information in a personal web page.

The invention may be embodied in the form of a computer, a method of operation of a computer, or a computer program product for generating a filter script to locate and retrieve variable data from one or more Internet sites. The invention uses memory in a computer for storing a document such as a personal web page template. A computer browser may hold a program that executes features of the invention. The browser locates key pages on the Internet. Portions of the pages are highlighted. The highlighting provides filter scripts. When the browser is operated in accordance with the invention, it locates the previously identified web pages and extracts data from the previously highlighted portions. The highlighted portions are then automatically inserted into the stored template.

As a method, the invention marks a reference point at a chosen Internet site such as a page on the World Wide Web. It stores the address of the page and a reference location on the page that is proximate to desired data. The program generates and stores a label corresponding to the desired data. When the program is later activated, it searches the Web for the stored pages, accesses the site with the stored site address and marked reference point and retrieves the targeted data at the site corresponding to the stored label.

DETAILED DESCRIPTION OF THE INVENTION

Figure 1:
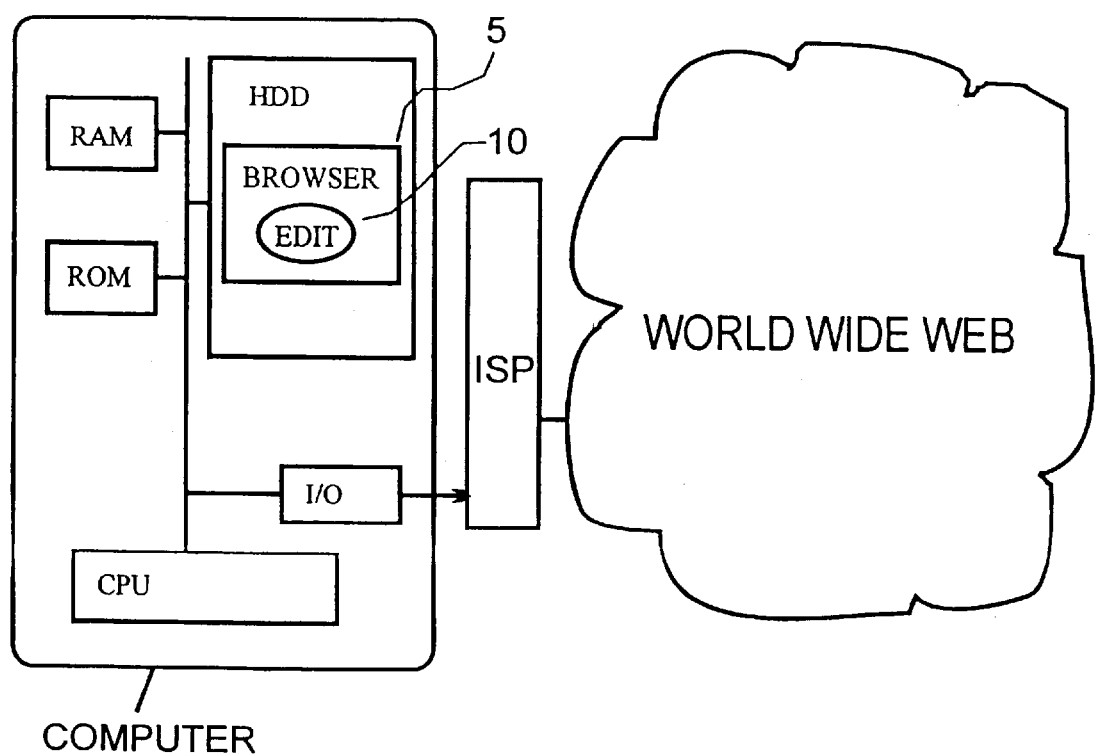
FIG. 1 is a schematic drawing of a computer for practicing the invention.

With reference to FIG. 1, the invention is implemented as a computer program that is stored on a hard disk drive (HDD) of a computer. Any suitable computer storage may be used so long as the storage means is accessible by the central processing unit (CPU) of the computer. The typical computer includes a random access memory (RAM) that temporarily holds program data and a read only memory (ROM) that holds computer programs to operate the CPU. The computer communicates to the outside world, including the World Wide Web (WWW), using a suitable input/output (I/O) device such as a modem or a network card. The I/O device connects the computer to the WWW through an Internet service provider (ISP). All of the foregoing elements of hardware are conventional and well-known to those skilled in the art. A browser is stored as a program on the ROM. The user operates the browser 5 to navigate across the WWW.

Figure 2:
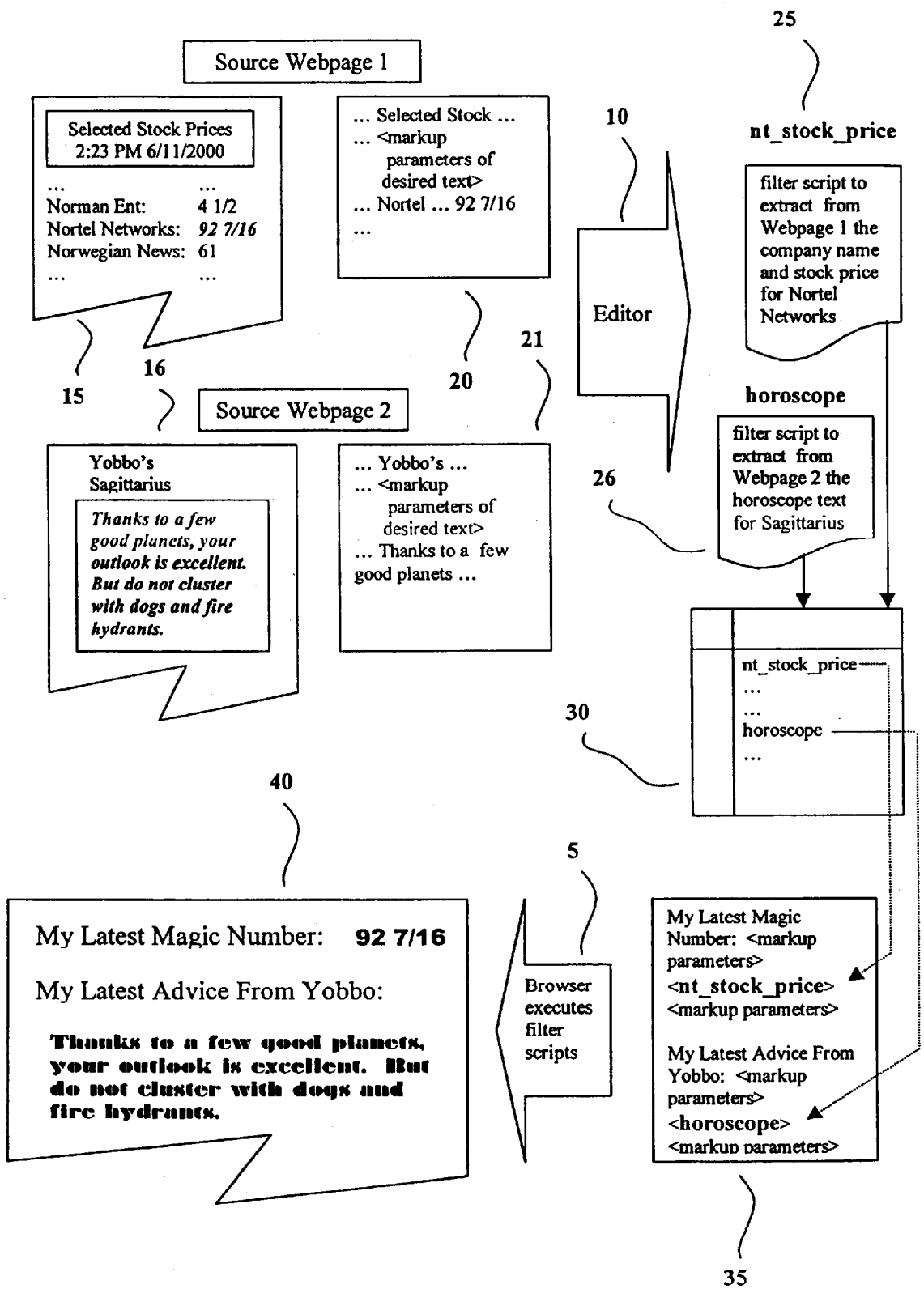
FIG. 2 shows a complete overview of the invention.

FIG. 2 shows how the browser 5 operates with Web pages. The World Wide Web consists in part of sets of user-readable Web pages 15, 16 prepared in source documents 20, 21 in varying mixtures of ordinary text, markup languages such as HTML or XML, and programming languages such as Java or ActiveX. To read any Web page 15 or 16, the user accesses it using a browser 5 which interprets a page's markup-language and programming-language instructions into sensory information perceptible to the user. Such sensory information may be visual, audible, tactile, or any combination of the three. The browser 5 is conventionally stored on the HDD of the computer.

The invention includes an editor 5 and a browser 5 capable of processing scripts 25 and 26 produced by editor 5. Editor 5 may itself be an integral part of a browser, an applet running within a browser, or a standalone application. Scripts 25 and 26 may be produced by editor 5 in any programming or markup language now or in the future usable within or in conjunction with Web browsers; the list of such languages currently includes Java, Javascript, HTML, XML, TCL, Visual Basic, and ActiveX. The invention also supplies the user with storage space 30 for scripts 25 and 26 produced by editor 5. The processing performed by the invention, including the execution of scripts 25 and 26, takes place on the user's system as connected to the World Wide Web. All browser 5 accesses to Web pages 15 and 16 referenced in scripts 25 and 26 take place across the World Wide Web as for any ordinary Web page access. Note that although two Web pages 15 and 16 and two respective scripts 25 and 26 are shown, there may be any number of such Web pages and their respective scripts used. The user applies the scripts 25 and 26 in a user-developed template 35 to display a Web page 40.

Figure 3:
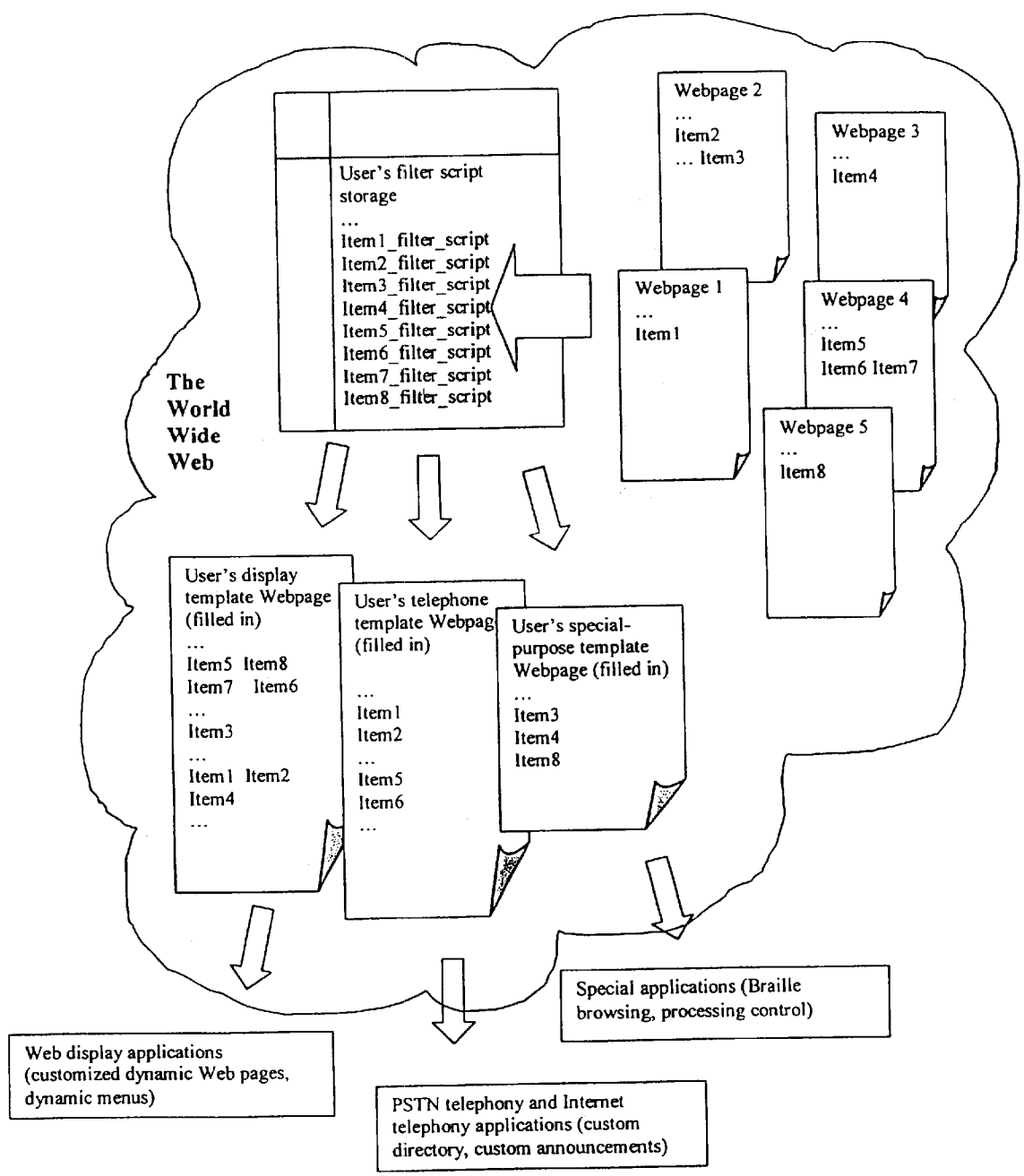
FIG. 3 shows how the invention extracts items from Web pages.
Figure 5:
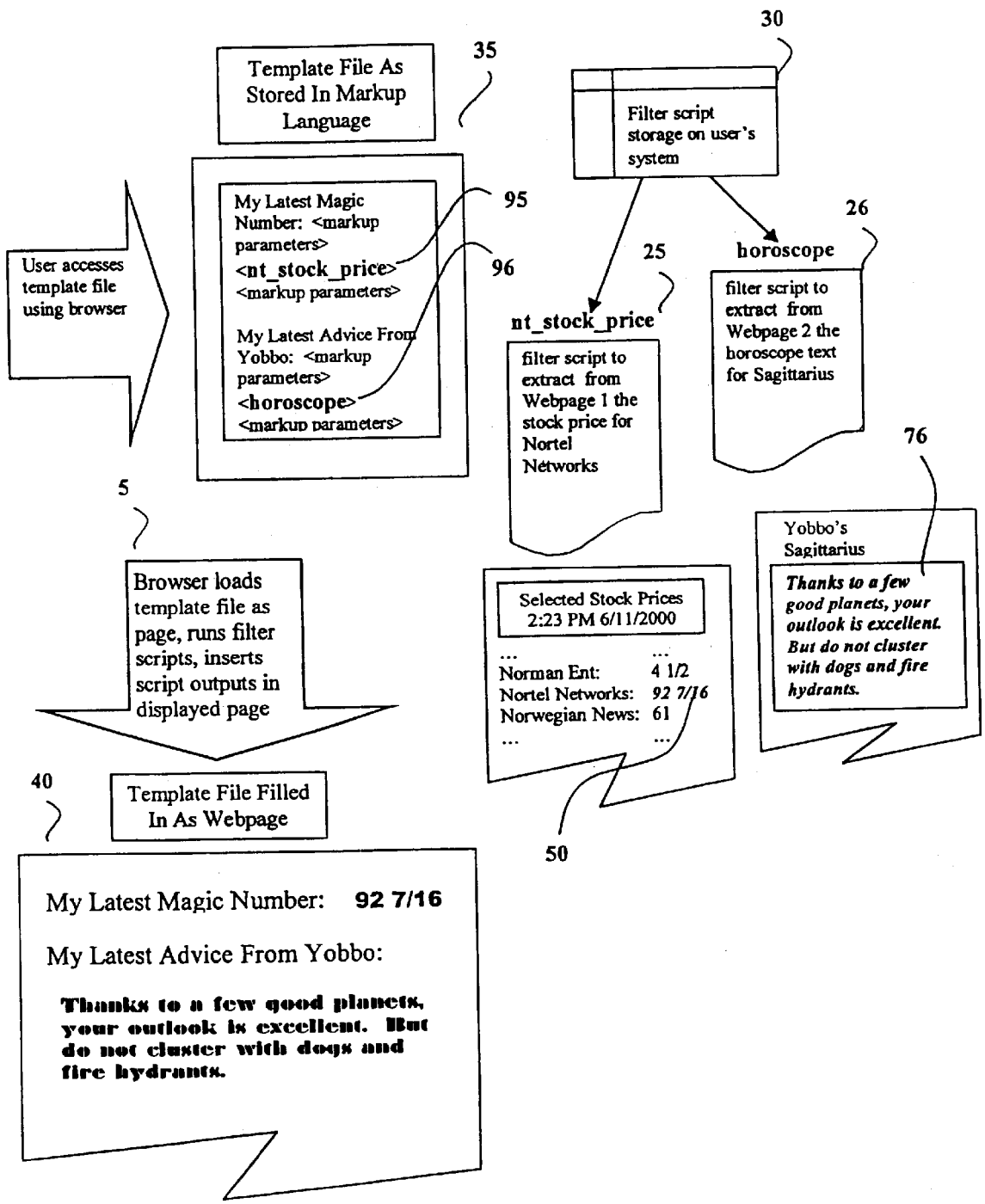
FIG. 5 shows an overview of the invention in a visual browser.

Turning to FIG. 3, the stored filter scripts FS 1–8 that operate on Webpages 1–5. The filter scripts includes scripts for Items 1–8 that are stored on the Webpages 1–5. More particularly, Webpage 1 stores Item 1; Webpage 2 stores Items 2 and 3; Webpage 3 stores Item 4; Webpage 5 stores Items 5–7; Webpage 5 stores Item 8. The Webpages are filtered by the filter scripts FS 1–8. The browser accesses each of the Webpages 1–5 on the WWW. Each accessed page is read by the browser using the filter script for the particular item. Located items are then extracted from the Webpage and are inserted into one or more of the user's display templates. The templates may be documents on the user's computer or Webpages that are operated or controlled by the user. In the example of FIG. 5, all of the items are inserted into the Userpage 1, Items 1,2, 5 and 6 are inserted in Userpage 2 and Items 3,4, and 8 are inserted into Userpage 3. The Userpages may be typical visual Web pages (Userpage 1), or custom announcement pages for directory assistance (Userpage 2) or even tactile display pages for browsing and reading data in Braille (Userpage 3). In a simple example, the Items may be telephone numbers for customer assistance at different companies. Userpage 1 has all the numbers, Userpage 2 has the numbers of only PSTN and Internet companies and Userpage 3 has special assistance numbers for Braille readers.

Figure 4:
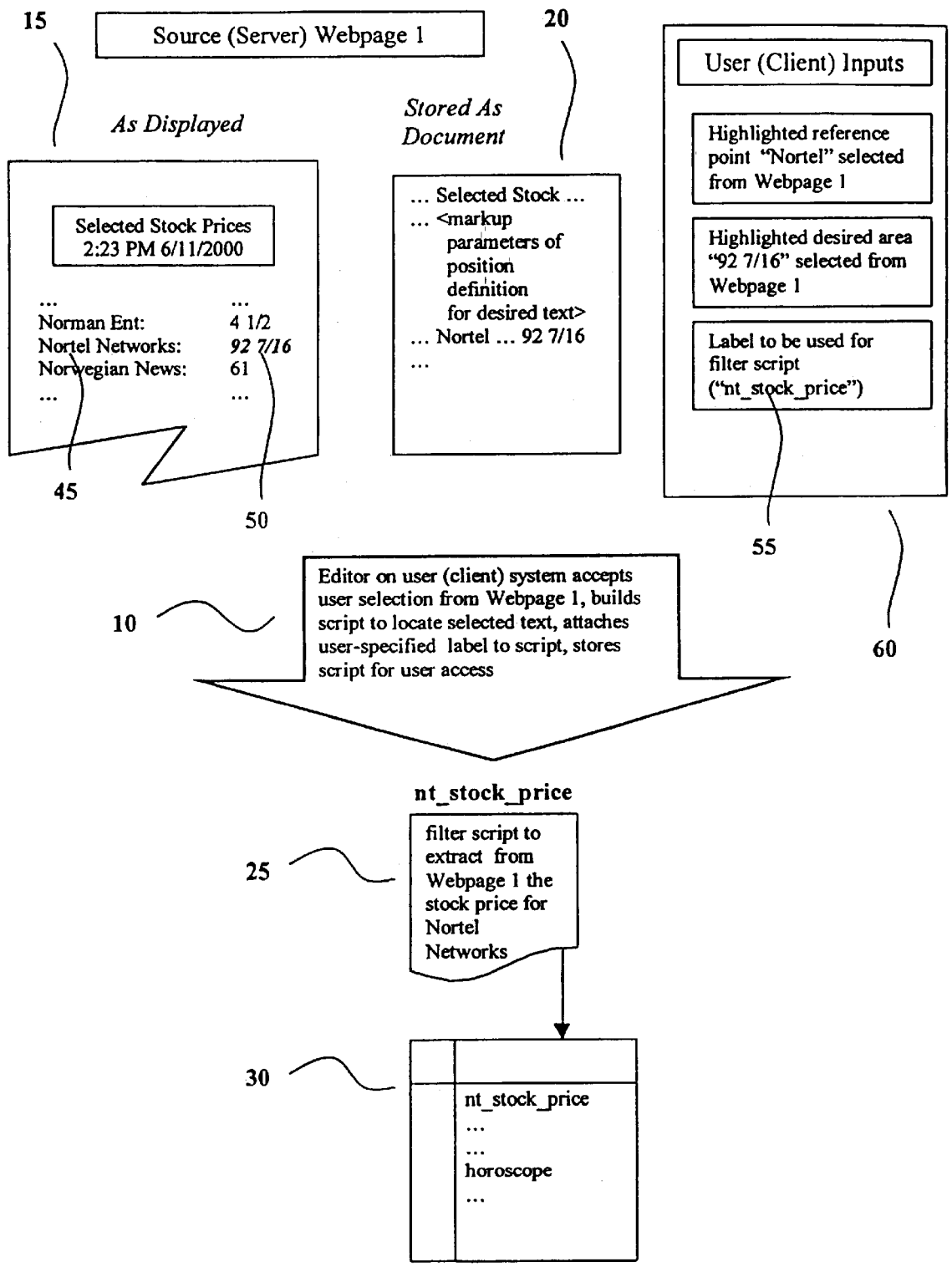
FIG. 4 shows how the invention generates and stores filter scripts.

FIG. 4 shows in detail the process of filter script generation and storage. The user accesses a desired Web page 15 with editor 10, highlights a reference point 45 and a specific desired data item 50 of the accessed Web page 15, and specifies a label 55 for script 25 to be used to access data item 50. Editor 10 accepts user inputs 60, scans the source document 20 for Web page 15 to locate item 50, processes text, markup language and programming language in source document 20 for item 50 to produce script 25, and stores script 25 under label 55 in a filter-script storage area 30 on the user's system.

FIG. 5 shows how a visual browser with the invention assembles Web data 50 and 76 into a template 35, through the application of editor-produced scripts 25 and 26. Template 35, seen through a browser 5, is an ordinary visual-display Web page 40, containing embedded references 95 and 96 to scripts 25 and 26 wherever the user wishes script-accessible data 50 and 76 to appear.

Figure 6:
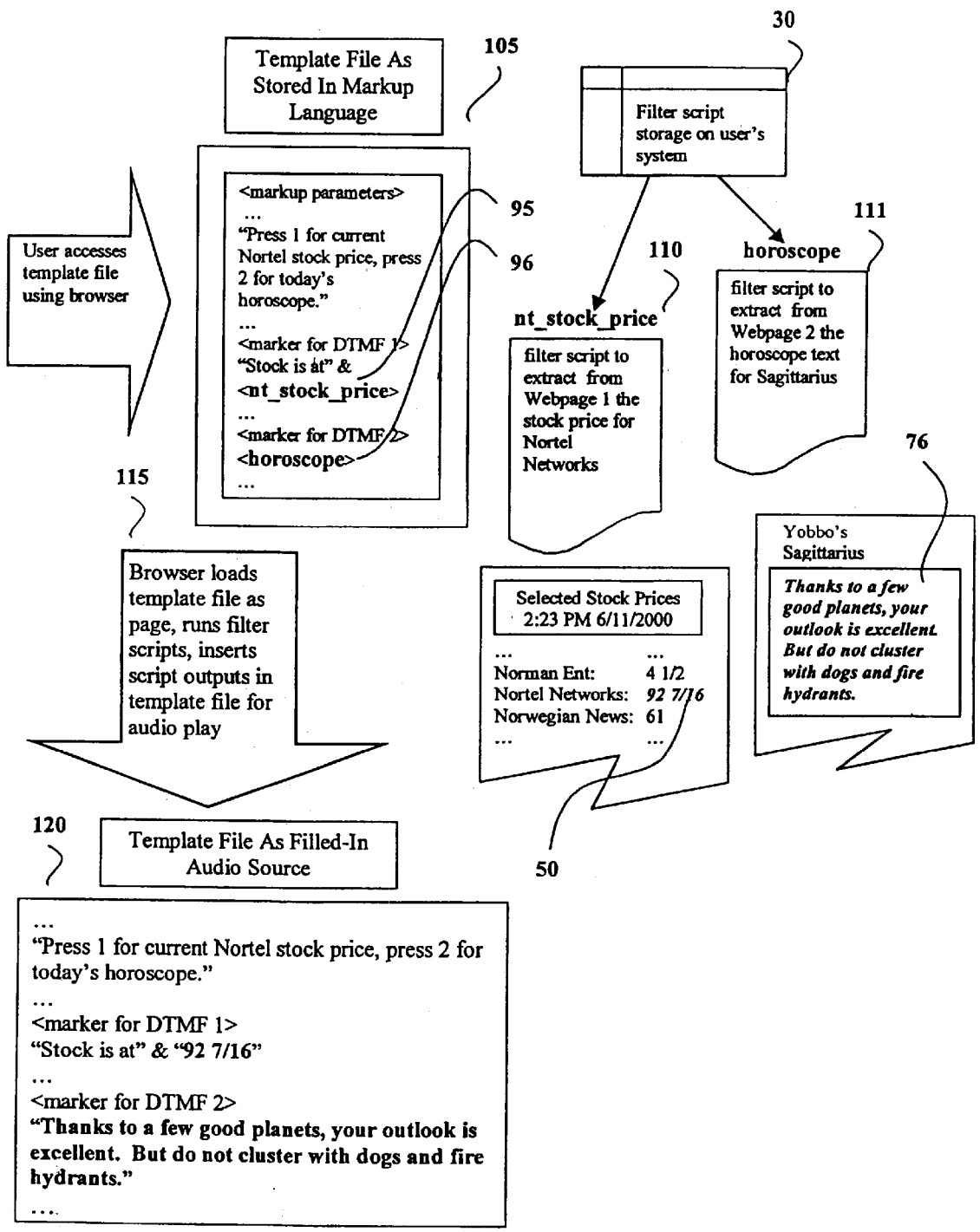
FIG. 6 shows how a visual browser uses filter scripts.

FIG. 6 shows how a telephone browser assembles Web data 50 and 76 into an audio template 105, through the application of one or more editor-produced scripts 110 and 111. Template 105, translated through a browser 115, is a telephone-accessible Web page 120, containing embedded references 95 and 96 to one or more scripts 110 and 111 wherever the user wishes script-accessible data 50 and 76 to be played back in audible form.

The Operation of the Invention

The invention entails two overall processes: generation of scripts to access specific components of Web pages, and execution of those scripts using a template Web page to assemble the disparate Web page components on a single page. A third process, the user's creation of the template Web page, is an ordinary Web page design task, and is not an essential part of the invention. References to the generated scripts embedded in the template must follow acceptable rules of syntax and operation required by the browsers to be used with the template.

See FIG. 4. In the generation process, the user retrieves a Web page 15 using editor 10. The user highlights or otherwise marks a reference point 45 of Web page 15 using editor 10, and highlights or otherwise marks a desired data item 50 of Web page 15 using editor 10. The user then specifies a label 55 to be used as an identifier for a retrieval script 25 to be generated for the marked area 50. The user then directs editor 10 to produce script 25.

Editor 10 scans the source document 20 for Web page 15, locates reference point 45, and locates marked area 50. Applying the information used to find marked area 50, Editor 10 generates script 25 to perform the same task of locating area 50. Script 25 includes, but is not confined to, instructions for locating Web page 15 and instructions for locating reference point 45 and marked area 50 in the source document 20 for Web page 15. Editor 10 then stores script 25 in filter script storage 30 on the user's system.

It should be noted that although a user may be able to mark a data item as displayed on the screen, any stored markup or other language used to produce the visual display may not be capable of straightforward scanning and interpretation. For example, an apparently-static display may be actually produced by the continuing execution of a screen-refreshing program. In this situation, even the visual appearance of a single string of text may not be reproducible in a script without including the code or codes comprising the screen-refreshing program, along with any interpreters or compilers capable of executing those codes.

The proposed editor, however, may well be constructed so as to support the inclusion of such codes and their supporting interpreters, compilers and other such software; in this case, the proposed invention's capabilities address a wider range of potential script-development options.

Again, see FIG. 4. Wherever editor 10 detects a situation in which it cannot produce a working filter script 25 for a Web page 15, editor 10 displays to the user a message (not shown) indicating the nature and effects of the problem or problems it encountered.

See FIG. 5. At this point, scripts 25 and 26 are stored in filter-script storage 30 and ready for use, and the user will have constructed template 35 containing references 95 and 96 to scripts 25 and 26 respectively. References 95 and 96 are embedded in template 35 so as to display their respective data in locations and forms specified in template 35. To display template 35 with information filled in from other Web pages, the user accesses template 35 using a browser 5. Browser 5 loads template 35, based on references 95 and 96 processes scripts 25 and 26 included in template 35, inserts script outputs (not shown) in template 35, and displays page 40. Note that any number of such references may be incorporated in template 35; the number of two references was used for illustrative purposes only.

The same process takes place when a telephone browser is used with the template. See FIG. 6. Scripts 110 and 111 are stored and ready for use, and the user will have constructed template 105 containing references 95 and 96 to scripts 110 and 111 respectively. References 95 and 96 are embedded in template 105 so as to play back their respective data in locations and forms specified in template 105. To play back template 105 with information filled in from other Web pages, the user accesses template 105 using a browser 115. Browser 115 loads template 105, processes all scripts S4 included in template 105, inserts script outputs (not shown) in template 105, and plays back template 105 with its filled-in information. As with FIG. 5 and the visual browser, note that any number of such references may be incorporated in template 105; the number of two references was used for illustrative purposes only.

Figure 7:
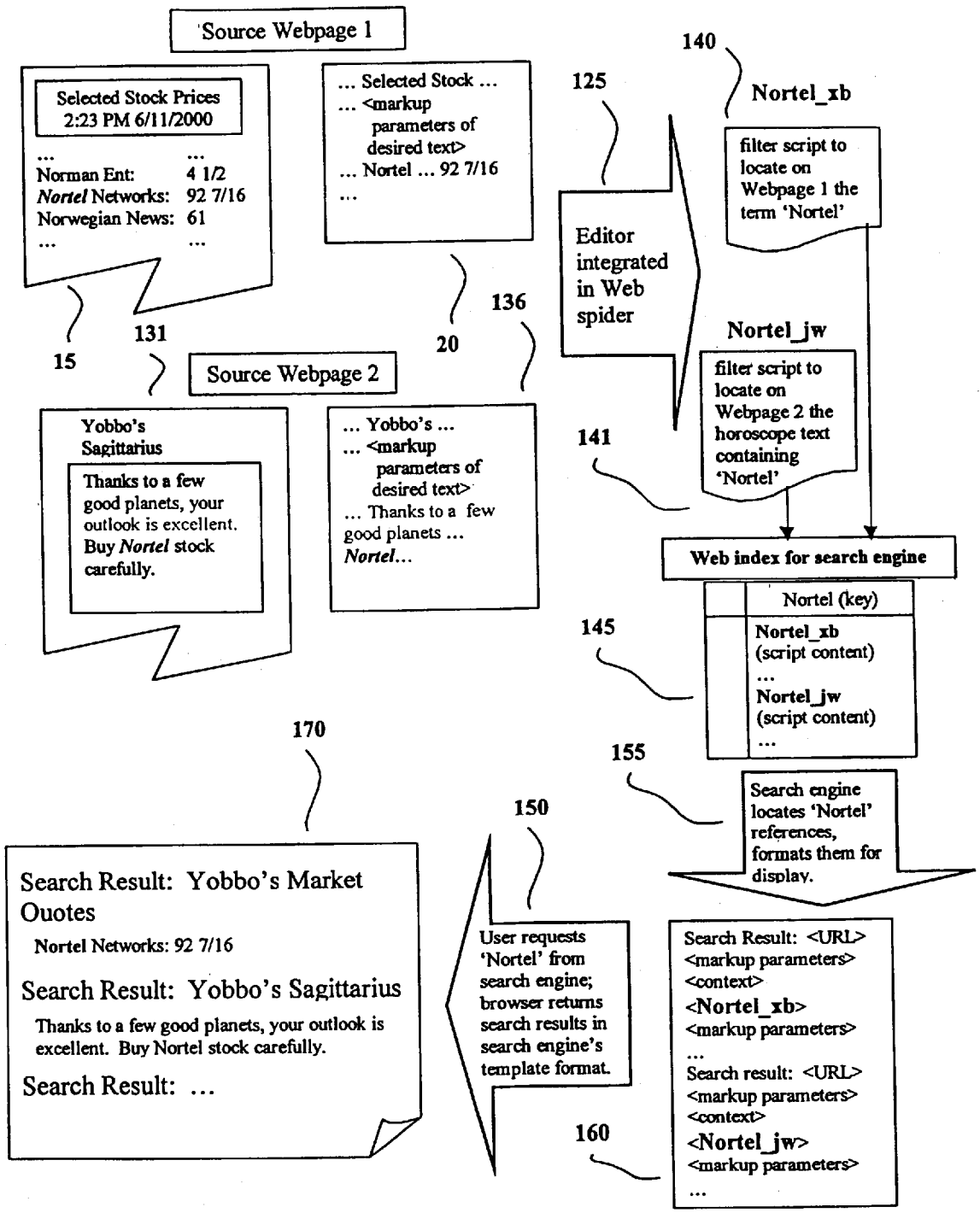
FIG. 7 shows the use of the filter scripts within a template file usable by a telephone 'browser'.

The use of the invention in concert with Web search software is quite similar to the previously-described usages. The processing is as follows. See FIG. 7. As a part of its overall task, Web indexing spider with the proposed editor integrated 125, compiles Web references to the term 'Nortel'. Among many other references, spider 125 locates Web pages 15 and 131, notes their URLs, and uses its integrated editor to process the source documents 20 and 136 to create scripts 140 and 141 for finding the term 'Nortel' on each page. Spider 125 stores each script with its URL and a generated identifier in Web index 145 for the search engine 155.

When the user executes a search for 'Nortel' using script-capable browser 150 and search engine 155, search engine 155 selects all index entries for 'Nortel' and formats them as search results 160 for browser 150 use. Browser 150 displays the formatted results as a Web page 170, with the term 'Nortel' prominently placed in each result.

Alternate Embodiments of Invention

The use of a visual browser (FIG. 5) to display the template and its filled-in data from other Web pages constitutes one embodiment of the invention.

The use of a telephone browser (FIG. 6) to speak the template and its filled-in data from other Web pages constitutes a separate embodiment of the invention usable in telephony applications where only a telephone is available for browsing. This embodiment offers the possibility of a voice-based and customized directory service.

The use of a Braille or other tactile-translation browser (not illustrated) to translate the template and its filled-in data from other pages into tactile information constitutes a separate embodiment of the invention usable in applications requiring tactile input to the user.

Constituting a separate embodiment of the invention, the invention's editor may be incorporated into an indexing Web spider, in order to supply a Web search-engine user with the position of the desired search term or terms in the found pages. Ordinarily, the Web spider for a search engine scans Web pages and returns for indexing purposes the identifier (URL) of the page in which searchable text to be indexed is found. Integration of the invention's editor in a Web spider, together with automation of the assignments of reference points and labels, allows the spider to store both the URL and the script to access the in-page location of the indexed text. The index compiled by the spider then contains not only a URL for each Web page in which the term is found, but also a script to point to the precise location of the searched text within the page. The search-engine software can then use the index to pinpoint and display the found text. The user may therefore retrieve and display Web search results without paging and manually searching in the found pages.

Illustrative Example

Turning to FIG. 5, to generate a filter script, a user navigates the editor/browser to the Web page for the Nortel Networks stock quote from Yahoo.com: http://quote.yahoo.com/q?s=nt&d=v1. The user then highlights the text "NT" on the displayed page, and clicks on the right mouse button, which presents two entries: "Define Reference Point" and "Create Variable". The user clicks on "Define Reference Point". The editor/browser then incorporates the highlighted text ("NT") into a new filter script to search the displayed Web page for that text. This action defines the text on the displayed page to be used as a fixed reference point for locating variable information on that page.

The user then highlights the stock price, which is a dynamic field (i.e., its value changes from time to time), clicks on the right mouse button again, and then clicks on the entry "Create Variable". The editor/browser then presents a dialog box requesting the name of a variable to be used to access the highlighted stock price. The user enters the name "nt_stock_price". The editor/browser then incorporates into its new script the instructions necessary to locate and retrieve the stock price from the Web page, using the specified reference point as a starting point for the location and retrieval. (An example of one class of such instructions is a script using search commands for the sed utility. Sed, using its script commands, can extract specific data fields from a page of text using previously-defined fixed reference points or patterns.)

The editor/browser then prompts the user to save the generated script; if the user accepts, the script is saved on the user's system under the variable name supplied by the user ("nt_stock_price").

The user then creates a template file of the user's own design. In this file the user inserts references to the variables created in the manner described above. An example using Unix scripting conventions might look like this:

The current price of Nortel Networks stock is ${nt_stock_price}.

The template file is then saved, and a URL is generated which the user can bookmark. At the time the template URL is accessed with a browser, following a Unix-like pattern, the template is processed using a CGI (Common Gateway Interface) script or other processing program which expands each variable to its current value. When the variable "nt_stock_rice" is encountered, its definition is retrieved, the URL is fetched, and the associated filter script is run. The script substitutes the resulting data into the position of ${nt_stock_price} in the template. This illustration shows how accessing this template URL presents the processed template with all embedded variables expanded to their values as determined at the time the browser accessed the template.

This invention was originally conceived in the context of a Nortel telephony application which uses text-to-speech technology. As an enhancement to support a telephone interface, the template file could contain embedded marker strings to indicate touch-tone jump points. An example of such a template file might be:

<DTMF#> Nortel stock price is ${nt_stock_price}<DTMF#> Lucent stock price is ${lu_stock_price}<DTMF#> Sun Microsystems stock price is ${sun_stock_price}.

When played through a telephone browser, the computer recites the contents of the filled-in template file. If the user hits a DTMF # key, the computer jumps ahead to the next <DTMF #>marker. To jump directly to a text section, a user could compose a template file such as the following:

Press 1 for stock prices, press 2 for your horoscope, press 3 for weather. <DTMF 1> Nortel stock is ${nt_stock_price}. Lucent stock price is ${lu_stock_price}. Sun Microsystems stock price is ${sun_stock_price}. <DTMF 2> Your horoscope for today is ${horoscope}. <DTMF 3> The weather today is ${todays_weather}.

This provides a telephone user a means to navigate quickly around template files of the user's own design.

Conclusions, Ramifications and Scope

The description, operation and illustrative material shown here portray the invention's unique ability to collect and display, on a single page, a substantial number of items of information taken on a real-time basis from many Web pages in many different locations. For a Web user, this eliminates the task of performing such collection on a manual, page-by-page basis. It has the additional advantage to the user of permitting the application of distinct Web-page formatting to the information collected.

Many programs have been written which visit site after site to compile indices of information on Web pages everywhere, so that the Web user may look up specific pages according to specified search criteria. These programs are called 'search engines'. All of these programs operate at a page level: the smallest unit returned to the searching user is a complete Web page, which the user must scan manually to find desired information. By its incorporation in the indexing functions of a search engine, the invention offers a step forward from the situation just described, in terms of granularity of access. A user of a search engine employing the invention will receive from a search not only indexing information on the page, but also a precise script which, when executed by the user's script-capable browser, will present the user with the exact location of the terms the user searched. For the user, the script eliminates manual searches within a Web page; for the search-engine supplier, the capability just described offers added value for the product. For the telephone browser, the reduction of returned results from a Web access produces cost savings in storage and output requirements. The capabilities described above make the invention useful to the Internet community at large, and make it attractive to the developers and providers of browser and search-engine software as an incorporated element in their products. To the end user, the invention offers the ability to drastically lessen the time spent hopping from site to site on the World Wide Web. For telecommunications suppliers such as Nortel Networks, the invention provides a strong component of Web software which can be marketed to software-development firms as a value addition. The invention's telephone-browser embodiment offers the telecommunications supplier an attractive component to augment and leverage the sale of 'smart' telephones integrated in their operation and richness of function with the World Wide Web itself. Although the description, operation and illustrative material above contain many specifics, these specifics should not be construed as limiting the scope of the invention but as merely providing illustrations and examples of some of the preferred embodiments of this invention. For example, the choices of programming languages, filter-script languages and processing methods may be designed and implemented in any combination which produces the effects specified for this invention. Thus the scope of the invention should be determined by the appended claims and their legal equivalents, rather than by the examples given above.

What is claimed:

1. A computer program product for generating a filter script to locate and retrieve variable data from one or more Internet sites, the computer program product comprising a computer usable storage medium having computer readable program code means embodied in the medium, the computer readable program code means comprising:

means for marking a reference point at a chosen site proximate to desired data;

means for storing commands to locate the site, the marked reference point at the site and the data proximate the reference point;

means for generating and storing a label corresponding to the desired data; and means responsive to an update request for automatically accessing the site with the stored site address and marked reference point and retrieving data at the site corresponding to the stored label.

2. The computer program product of claim 1 wherein the marked reference site corresponds to a fixed artifact and the desired data may be variable.

3. The computer program product of claim 1 further comprising means for generating a template including the desired data.

4. The computer program product of claim 3 further comprising means for inserting the desired data into the template.

5. A browser for operating a computer to navigate to one or more sites on the Internet, said browser comprising an editor computer program product for generating a filter script to locate and retrieve variable data from one or more Internet sites, the editor computer program product comprising a computer usable storage medium having computer readable program code means embodied in the medium, the editor computer readable program code means comprising:

means for marking a reference point at a chosen site proximate to desired data;

means for storing commands to locate the site, the marked reference point at the site and the data proximate the reference point;

means for generating and storing a label corresponding to the desired data; and means responsive to an update request for automatically accessing the site with the stored site address and marked reference point and retrieving data at the site corresponding to the stored label.

6. The browser of claim 5 wherein the browser is selected from the group consisting of visual browsers, audio browsers and braille browsers.

7. The browser of claim 5 wherein the marked reference site corresponds to a fixed artifact and the desired data may be variable.

8. The browser of claim 5 further comprising means for generating a template including the desired data.

9. The browser of claim 8 further comprising means for inserting the desired data into the template.

10. A method for generating a filter script to locate and retrieve variable data from a plurality of Internet sites, the method comprising:

- at a chosen site, marking a reference point proximate to desired data;
- storing commands to locate the site, the marked reference point at the site and the data proximate the reference point;
- generating and storing a label corresponding to the desired data; and
- in response to an update request, automatically accessing the site with the stored site address and marked reference point and retrieving data at the site corresponding to the stored label.

11. The method claim 10 wherein the marked reference site corresponds to a fixed artifact and the desired data may be variable.

12. The method of claim 10 further comprising generating a template including the desired data.

13. The method of claim 12 further comprising inserting the desired data into the template.

14. A computer programmed to generate a filter script to locate and retrieve variable data from one or more Internet sites, the computer comprising:

- a storage medium having computer readable program code means embodied in the medium;
- a central processing unit for executing programs stored in the storage medium and for reading and writing data to one or more locations in the storage medium;
- means for marking a reference point at a chosen Internet site proximate to desired data;
- means for storing commands in the storage medium to relocate the site, the marked reference point at the site and the data proximate the reference point;
- means for generating and storing in the storage medium a label corresponding to the desired data;
- means responsive to an update request for automatically accessing the site with the stored site address and marked reference point and retrieving data at the site corresponding to the stored label; and
- means for writing the retrieved data to one or more storage locations in the storage medium.

15. The computer of claim 14 wherein the marked reference site corresponds to a fixed artifact and the desired data may be variable.

16. The computer of claim 14 further comprising means for generating a template including the desired data.

17. The computer of claim 16 further comprising means for inserting the desired data into the template.

* * * * *